Dec. 27, 1960  G. N. GAGLIARDI  2,966,512
CRYSTALLIZATION OF N-ALKYL GUANIDINE SALTS
Filed Jan. 29, 1958  4 Sheets-Sheet 1
FIG. I
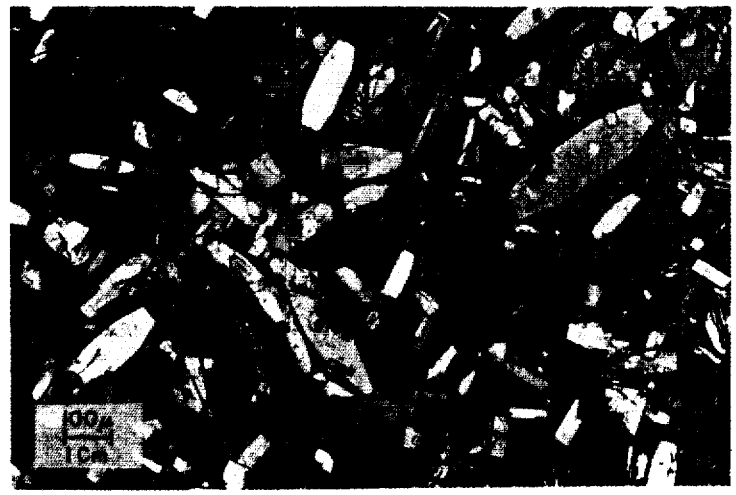
FIG. 2
INVENTOR
GEORGE N. GAGLIARDI
BY
ATTORNEY Dec. 27, 1960  G. N. GAGLIARDI  2,966,512
CRYSTALLIZATION OF N-ALKYL GUANIDINE SALTS Filed Jan. 29, 1958  4 Sheets-Sheet 4

*INVENTOR.*

GEORGE N. GAGLIARDI

BY

ATTORNEY

United States Patent Office 2,966,512
Patented Dec. 27, 1960

---

2,966,512
CRYSTALLIZATION OF N-ALKYL GUANIDINE SALTS

George N. Gagliardi, Springdale, Conn., assignor to American Cyanamid Company, New York, N.Y., a corporation of Maine Filed Jan. 29, 1958, Ser. No. 711,906

1 Claim. (Cl. 260—501)

This invention is concerned with a new and novel crystallization procedure. In particular, it deals with an improved crystallization schedule, whereby certain long-chain alkyl-substituted guanidine salts may be recovered from hot aqueous reaction liquors in more satisfactory condition.

Salts of long-chain alkyl-substituted guanidines and various organic and inorganic acids have a number of industrial uses. Of particular interest in the present invention are those n-alkyl guanidines in which the n-alkyl group contains from about 8 to about 18 carbon atoms. Their salts, formed with a number of different acids, are characterized by fungicidal activity. For purposes of illustration in the present discussion, n-dodecylguanidine acetate may and will be taken as a typical salt.

Prior to the present invention, commercial preparation of n-dodecylguanidine acetate was limited by processing problems. For example, the acetate is quite soluble in the hot reaction liquor in which it is prepared. When crystallized therefrom by cooling, the crystal content of the resultant slurry is exceedingly difficult to recover by ordinary filtration and washing techniques. Moreover, when finally so-recovered, the product color may not be satisfactory. This appears to be caused by retained impurities that are not removed by washing schedules capable of practice on a commercially-feasible basis.

It is, therefore, the principal object of the present invention to develop a recovery method which is not subject to these solid-separation and washing problems and will permit increased production from available equipment. It is a further object of the invention to recover the product in better quality and in better condition with respect to filtering and washing properties.

In the past, in commercial production of crystalline products, such problems have not been unusual. In general, they have been readily overcome by so-treating the liquor as to increase the average crystal size, usually by reducing the rate at which the liquor is cooled. Increasing the cooling rate to precipitate the crystals more rapidly is not useful. It results in very finely-sized crystals which are even more difficult to filter and wash. Surprisingly, in the case of the crystals of the present invention, such as the illustrative n-dodecylguanidine acetate, decreasing the cooling rate produces little or no resultant improvement in the filtering and washing rates.

Quite unsuspectedly, in view of previous experience with such problems, the objects of the present invention have been accomplished in a surprisingly successful manner by ignoring the teachings of the prior art. This is done by cooling the solution as rapidly as is practicable with the available equipment. According to the present invention, when this unusual practice is adopted, one obtains a crop of crystals of entirely different habit. They are surprisingly free from handling problems in washing and filtering. Because of the shortened processing schedule, production can be markedly increased. Finally, it is readily possible to obtain the product not only in good yield but in high quality.

The invention will be more fully discussed in conjunction with the accompanying illustrations which show photomicrographs of the product crystals enlarged 100 diameters. In the illustrations:

Figure 1 shows a typical product obtained by using the customary cooling procedure in previous use;

Figure 2 shows a typical product obtained according to the present invention and the completely different crystal habit;

Figure 4:
Figure 4 shows a product obtained under identical conditions to that of Figure 3 except that the cooling rate is adequate.

While the salts of the present invention may be prepared in any suitable manner, one which is preferred is disclosed in United States Letters Patent No. 2,425,341. As disclosed therein, an aqueous solution of cyanamide is caused to react with an alkylamine in the presence of a monocarboxylic acid. This procedure, as applied to the preparation of the illustrative n-dodecylguanidine acetate, is shown in the following example.

Example 1

Seventy-five pounds of a commercial grade of dodecylamine and 175 pounds of water are charged to a closed reactor at room temperature. The mixture is heated with agitation to about 70° C., and 13.5 of glacial acetic acid added. An exotherm to about 85° C. follows, and at this temperature 10 cc. of a commercial silicone antifoam agent (Dow Corning Antifoam Emulsion A) is added. Heating is continued to 95° C., and a mixture of 7.2 pounds of glacial acetic acid and 103.5 pounds of 25% aqueous cyanamide solution is added over a period of about one hour. The reaction mixture is then heated at 98–100° C. for 2.5 hours and adjusted to about pH 8 by the addition of approximately one pound of glacial acetic acid. Some 75% or more of the actual n-dodecylamine content is converted to dodecylguanidine acetate. The liquor also contains a considerable quantity of dodecylamine acetate and also various impurities resulting from miscellaneous components in commercial grade reactants. Reaction liquor so produced is used in the following examples.

Example 2

To illustrate the conventional prior practice, hot reaction liquor obtained as in Example 1 is diluted with about 188 pounds of water to a dissolved solids content of about 23.5 percent and the pH is adjusted to about 6–7 by addition of 5.6 pounds of glacial acetic acid and allowed to cool to about 20° C. in the closed reactor. Time required is about 18 hours. Thereafter, resultant slurry is pumped to a filter press which blinds badly and requires about 2.5 hours for loading. The filter cake is thoroughly washed on the filter for about one hour using cold water and then blown down for an additional hour. Resultant product assays about 95% dodecylguanidine acetate and about 0.7 dodecylamine acetate. A photomicrograph of a sample is shown at 100 diameters magnification as Figure 1.

Example 3

To illustrate the advantages of the process of the present invention, another sample of reaction liquor is diluted and pH adjusted as in Example 2. So-treated solution is cooled as rapidly as possible to about 20° C. About 4.5 hours is required. About 45° C. crystallization becomes noticeable. Below about 25° C., additional crystallization is substantially negligible. Crystals are collected by filtration, the time required being only about one-half hour for loading. The filter cake was washed with water in the press for about one-half hour and blown down for a further half hour. The time required is about 6 hours as compared with 22.5 hours required in the preceding example. About 91 lbs. of dodecylguanidine acetate is obtained at about 96.9% purity. Samples of washed product on examination show that the crystals are of columnar habit, being boat or coffin shaped. A photomicrograph of a sample at 100 diameters magnification is shown in Figure 2.

To obtain optimum results, several precautions should be observed in the practice of the present invention. As noted above, a primary factor is the rate of cooling. Substantially all of the crystallization occurs in the temperature range from about 50° C. to about 25° C. Over this range, cooling should be conducted as rapidly as possible, the maximum time not exceeding about 5 hours. The marked effect of altering the cooling rate is shown in the following examples.

*Example 4*

Figure 3:
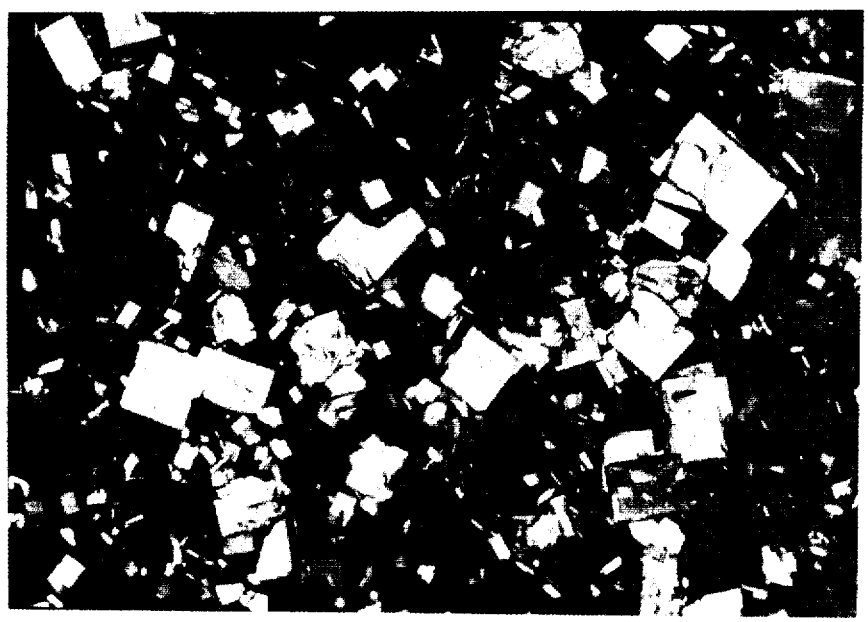
Figure 3 shows a typical product obtained when the cooling rate is too slow to obtain the desired crystal habit.

Another sample of liquor produced according to Example 1 is treated according to the procedure of Example 2 except that it is cooled at an intermediate rate by passing process water at about 25° C. through the cooling jacket. The agitator is run with a linear tip speed of about 89 ft./min. Product crystals are collected as in Example 3. A photomicrograph of a product at 100 diameters is shown as Figure 3. The crystals are seen to have the same undesirable crystal habit as those of Figure 1. The size is somewhat smaller due to the increased cooling rate over that of Example 2.

*Example 5*

To further compare the effect altering the cooling rate, Example 4 is repeated exactly except that cooling water at about 9° C. is used. A photomicrograph of a typical sample is shown as Figure 4. It will be seen that the crystals have the same habit as those of Figure 2 but are somewhat smaller.

A second factor is the concentration before crystallization. At this stage, the solution should have a dissolved dodecylguanidine salt content below about 20%. Examples 2 to 5 are carried out in this range at about 17–18%. Using too little water results in a slurry which is more difficult to filter. However, the use of more dilute concentrations results in the formation of crystals in a larger size range. This is shown in the following example.

*Example 6*

Example 5 is repeated except that an additional 188 lbs. of water is added, diluting the dodecylguanidine acetate content to about 13–14%. A typical sample at 100 diameters is shown in Figure 5.

Figure 5:
Figure 5 shows a typical product obtained from a liquor which is initially too low in dissolved product content.

Comparing the crystals of Figure 5 with those of Figure 4 it will be seen that the former are generally larger. However, any benefit of the increase in size is to a large extent offset by the fact that crystallization is not as complete. For this reason, concentrations below about 12% are not generally satisfactory and should be avoided.

The reactions by which dodecylguanidine acetate are formed usually produce a reaction liquor which is basic, normally having a pH of from about 9 to about 10. For best results, this liquor should be acidified, using the acid of which the salt with dodecylguanidine is to be formed. The preferred degree of acidity is from about pH 6 to about pH 7. Using larger quantities of acid usually increases the size of the product crystal size range. This is shown in the following example.

*Example 7*

Example 5 is repeated with the exception that about eleven pounds of glacial acetic acid is added in adjusting the pH. A photomicrograph of a product sample at 100 diameters is shown in Figure 6.

Figure 6:
Figure 6 shows a typical product obtained from a solution having too low a pH.

Comparison of the crystals of Figure 6 with the other illustrations shows a size range larger than in Figure 4 and comparable with that of Figure 2. Again, however, the advantage of the larger size is partly or wholly offset. Use of an increased amount of acid increases the solubility of the product in the liquor and decreases the extent of crystallization.

In general, well-defined crystals of uniform size are desirable. With the above-discussed precautions observed, both the size range and uniformity of the crystal product is affected to a marked degree by the intensity of the agitation during crystallization. This is a very difficult item to define. However, its effect is easily demonstrated as shown in the following example.

*Example 8*

Figure 7:
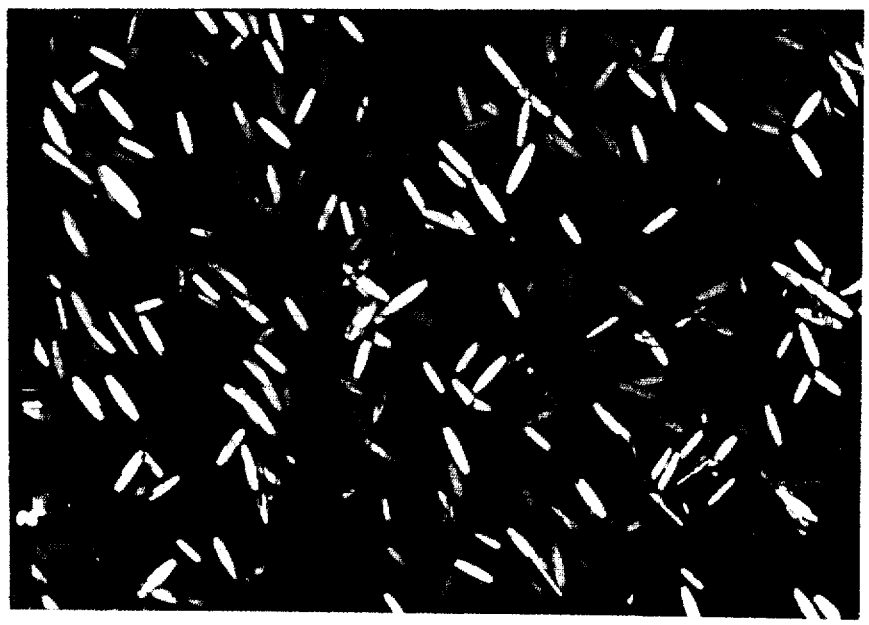
Figure 7 shows a typical product obtained by increasing the intensity of agitation.

The preceding Examples 2–7 were carried out in the same vessel which was equipped with a powered agitator. In Examples 3 and 5, which were carried out otherwise within the indicated optimum condition ranges, the agitator was run at a speed such that the agitator tip had a linear velocity of about 89 feet per minute. Example 5 was repeated except that this linear velocity was increased to about 265 feet per minute. A photomicrograph of a sample of the product at 100 diameters is shown in Figure 7. As will be seen, the average size is small and uniform and the product is in highly desirable physical condition.

In general, despite the fact that the process of the present invention goes completely contrary to the expectation of one familiar with processes of crystalling on commercial scales, the improvement is very marked. The time required for crystallization is reduced to some 50 to 80%. The time required for washing and filtering is reduced in proportion. Retained impurities are reduced some 50% or more, the dodecylamine acetate content, particularly, being greatly reduced over the best that could be previously obtained. As a result, the quality of the product is improved.

Other long-chain alkyl guanidine salts whose preparation may be improved by the practice of the present invention include the following typical examples.

| | M.P. (° C.) |
|---|---|
| Octyl guanidine acetate | 125–126 |
| Decyl guanidine acetate | 110–116 |
| Dodecyl guanidine acetate | 135–136 |
| Hexadecyl guanidine acetate | 135–136 |
| Octadecyl guanidine acetate | 125–127 |
| Mixed alkyl guanidine acetate (2%-$C_{14}$,24%-$C_{16}$,79%-$C_{18}$) | 110–115 |
| Mixed alkyl guanidine propionate (2%-$C_{10}$, 95%-$C_{12}$,3%-$C_{14}$) | 143–145 |
| Dodecyl guanidine formate | 76–77 |
| Dodecyl guanidine butyrate | 168–171 |

I claim:

In crystallizing n-dodecylguanidine acetate from reaction liquors in which they are completely soluble at above about 50° C., the improvement which comprises: adjusting the dissolved alkyl guanidine salt to a dissolved content of from about 12 percent to about 18 percent; adding to the solution a sufficient amount of an acid corresponding to the acid salt being formed to produce a free acid content corresponding to about pH 6 to about pH 7; cooling so-treated liquor to about 50° C. and thereafter further reducing the temperature to ambient temperatures of about 20 to 25° C. as rapidly as possible within a period of time not exceeding about 5 hours; and collecting resultant separating crystals.

References Cited in the file of this patent

UNITED STATES PATENTS 2,425,341    Paden et al.    Aug. 12, 1947

UNITED STATES PATENT OFFICE
CERTIFICATION OF CORRECTION

Patent No. 2,966,512                              December 27, 1960

George N. Gagliardi

It is hereby certified that error appears in the above numbered patent requiring correction and that the said Letters Patent should read as corrected below.

Column 2, line 31, after "13.5" insert -- pounds --.

Signed and sealed this 30th day of May 1961.

(SEAL)
Attest:

ERNEST W. SWIDER                              DAVID L. LADD
Attesting Officer                                Commissioner of Patents